Feb. 6, 1962
A. T. MURRI
3,019,756
NUCLEAR POWERED GROUND-EFFECT MACHINE FOR
OPERATION OVER WATER EMPLOYING
WATER SHIELDING
Filed Feb. 17, 1960
2 Sheets-Sheet 1
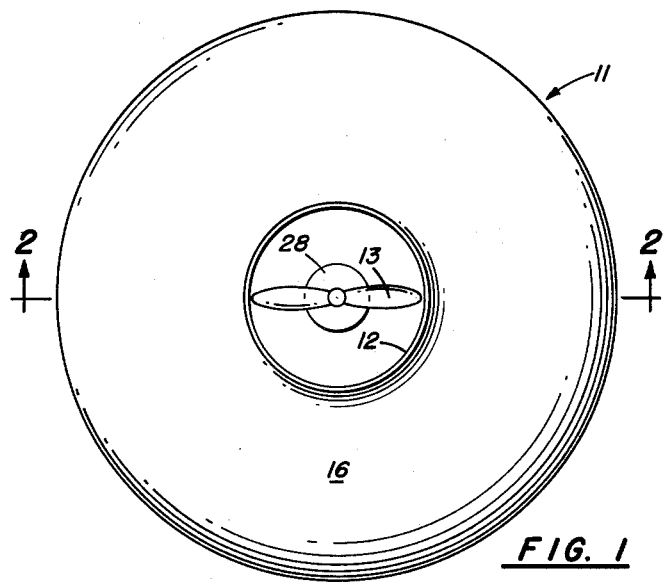
FIG. 1
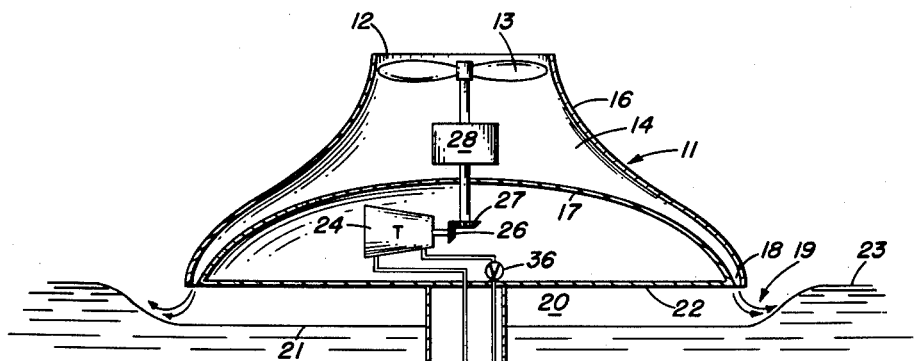
FIG. 2
Inventor
ALBERT T. MURRI
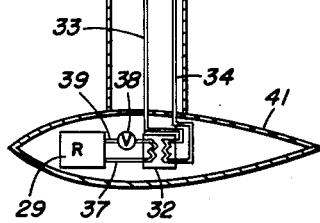
By R. I. Tompkins
Attorney Inventor
ALBERT T. MURRI

United States Patent Office 3,019,756
Patented Feb. 6, 1962

3,019,756
NUCLEAR POWERED GROUND-EFFECT MACHINE FOR OPERATION OVER WATER EMPLOYING WATER SHIELDING
Albert T. Murri, 7206 Lehigh Lane, Springfield, Va.
Filed Feb. 17, 1960, Ser. No. 9,399
6 Claims. (Cl. 114—67)
(Granted under Title 35, U.S. Code (1952), sec. 266)

The invention described herein may be manufactured and used by or for the Government of the United States of America for governmental purposes without the payment of any royalties thereon or therefor.

The present invention relates to ground-effect machines for operation over water and more particularly to nuclear powered ground-effect machines for operation over water and the shielding means therefor.

The general concept of the conventional ground-effect machine is not new. Broadly speaking, a ground-effect machine is a device designed to utilize the "ground-effect" phenomenon. This phenomenon is based upon the fact that when compressed air (or other gas) is discharged downwardly from the base of a device in relatively close proximity to the ground, a lift force greater than the jet reaction force will be realized. This added lift is a product of the creation of a high pressure bubble of the discharged gas, usually air, beneath the base of the device. In this manner the device or machine actually rides on a cushion of air.

These ground-effect machines are roughly of two types, those utilizing a peripheral jet (usually annular) and the so-called plenum chamber type. Insofar as the present invention is concerned its application is the same in either case but both will be illustrated in the explanation to follow. It should be appreciated, however, that in both types proximity to the surface is a prime requisite to the operation of any machine designed to operate as a ground-effect machine.

It is well recognized in the art that the employment of nuclear power plants for submarines, ships and airplanes yields the highly desirable advantage of sustained endurance without the necessity of refueling. In the case of the ground-effect machine such an application would seem equally advantageous but there are disadvantages as well, of course. Of great importance among these disadvantages is the considerable weight penalty resulting from the use of conventional shielding methods (such as lead) to protect the crew and the structure.

It is therefore an object of the present invention to provide a nuclear powered ground-effect machine for operation over water with the nuclear power plant so located as to permit the elimination of radiation reaching the crew and structure or at least reducing such radiation to a tolerable level.

Another object of the present invention is the provision of means for mounting a nuclear power plant for a ground-effect machine operating over water so as to protect the crew and structure and yet reduce the conventional shielding requirements therefor.

Still a further object of the present invention is to provide nuclear propulsion for an air-borne device operating over water whereby the nuclear heat source can depend from such device, remain submerged and yet be submitted to only a minimum of disturbance from surface waves.

Other objects and many of the attendant advantages of this invention will be readily appreciated as the same become better understood by reference to the following detailed description when considered in connection with the accompanying drawings wherein:

FIG. 1 shows a plan view of a peripheral jet type of ground-effect machine in which the present invention is embodied;

FIG. 2 is a section view taken on line 2—2 of FIG 1;

Figure 3:
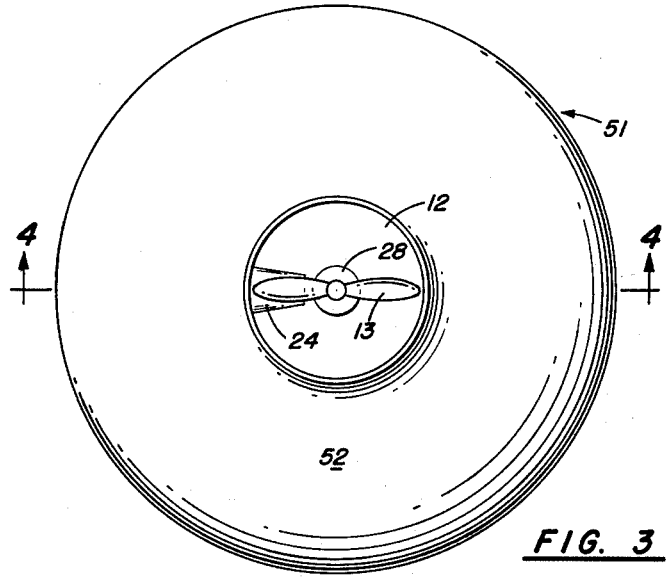
FIG. 3 shows a plan view of a plenum chamber type of ground-effect machine in which the present invention is embodied.

Referring now to the drawings, wherein like reference characters designate like or corresponding parts throughout the several views, FIGS. 1 and 2 show schematic view of the peripheral jet type of ground-effect machine 11 in which the present invention has been embodied. Air is drawn in through intake 12 by fan 13 and is pumped down into vertical well 14 between exterior housing 16 and interior housing 17 and is discharged from annular nozzle 18. The downwardly directed flow of annular jet 19 actually "walls in" the high pressure air in region 20 providing the "air cushion" that supports machine 11. This "air cushion" is generally termed the "ground cushion region." Jet discharge 19 need not come from an exit or outlet truly annular in platform as long as the shape thereof is that of a closed plane curve or polygon. As can be seen from FIGURE 2 when a ground-effect machine is operating over water the area 21 of water under base 22 of machine 11 is dished out and is at a lower elevation than the surrounding water surface 23.

The drive for fan 13 is supplied by expansion-type turbine 24 through pinion gears 26, 27 and clutch and reduction gear unit 28. Other conventional means of power transmission will suffice as this forms no part of the present invention. Any or all of this construction may be enclosed in inner housing 17 as may be desired in the particular design.

Any conventional heat source could, of course, be used as a source of heat energy for the motive fluid for turbine 24 but the use of a nuclear reactor 29 is highly desirable particularly from the standpoint of endurance. Since certain disadvantages accompany the use of a reactor as a heat source, means for overcoming these disadvantages must be provided. Of prime importance is the necessity for shielding to protect both personnel which would be located in inner housing 17 or in some adjacent superstructure (not shown) and the structure itself. Thus, to avoid the use of heavy conventional lead shielding, reactor 29 is suspended below machine 11 by strut 31 so that a depth of water lies at all times between the machine 11 and reactor 29. In this way the water itself which provides an effective shield is utilized as the shielding means the reactor being operated at a depth selected to yield the desired factor of safety from radiation for both personnel aboard machine 11 and for the structure of machine 11 itself.

As recited above when machine 11 passes over the surface 23 the area 21 beneath the base 22 is dished out and greatly reduced in turbulence. This action is particularly beneficial to the combination of ground-effect machine 11 and submerged reactor 29 since for the most part the reactor and its components will not be subjected to the jarring and disturbance that would be experienced if, for example, such a reactor were attached to and submerged below an ordinary surface vessel. Also since numerous piping and service lines as well as control elements and leads therefor must be maintained connecting the reactor 29 and machine 11 (these elements being passed through strut 31) it is imperative that such items be free from stress. Of course, the problem can be solved by using a highly reinforced strut 31 but this involves a weight penalty. By using an airborne vehicle which reduces surface turbulence as it proceeds, the extent of stress incurred is greatly decreased with resultant decrease in design demands. Such an advantage is achieved by the combination of ground-effect machine 11 and submerged reactor 29.

As seen in FIGURE 2 turbine 24 is connected to heat exchanger 32 by supply pipe 33 and return pipe 34. The working fluid is circulated through this secondary circuit by means of valve 36. Heat is supplied to heat exchanger 32 via the primary circuit comprising reactor 29, supply pipe 37, return pipe 39 and valve 38.

To facilitate passage of reactor 29 and the other submerged components of the invention through the water, hull 41 may be supplied as an enclosure therefore. In addition, hull 41 can be shaped like an airfoil so that lift is created from its forward motion through the water. It is also worthy of note that a certain amount of lift is realized from the buoyant force acting on hull 41 or upon reactor 29 itself, if unenclosed.

Figure 4:
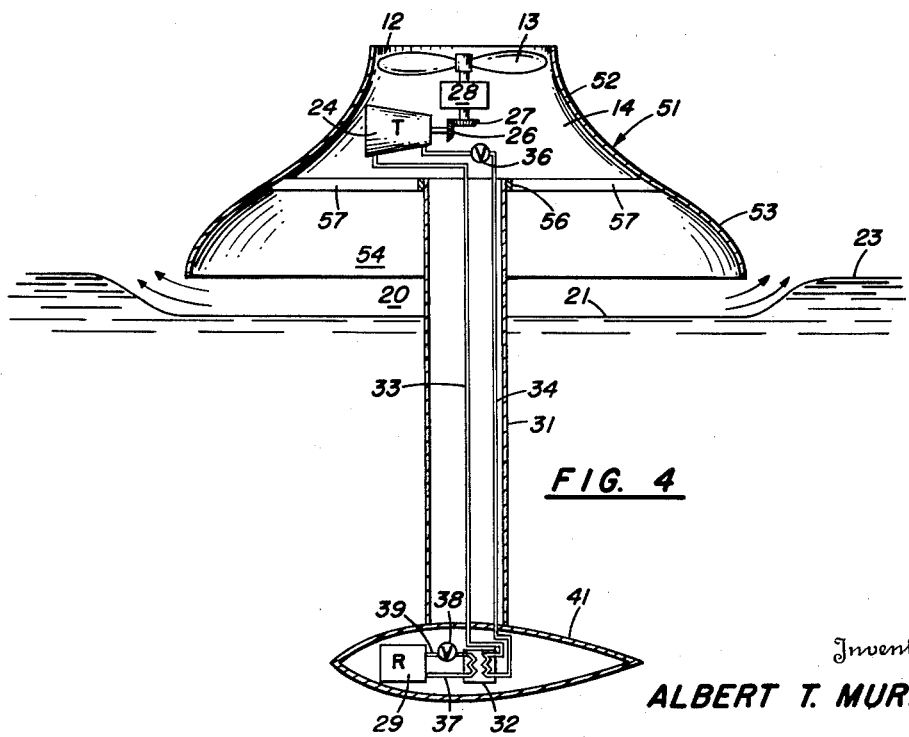
FIG. 4 is a section view taken on line 4—4 of FIG. 3.

Turning now to the other parts of the drawing, FIGS. 3 and 4 show the application of the present invention to the plenum chamber type of ground-effect machine 51. Such a device may consist of a single housing 52 having a concave skirt or dished-out lower portion 53. Air is inducted through intake 12 into vertical well 14 in the same manner as in the peripheral jet type by the use of fan 13. This air is likewise pumped down into vertical well 14 but instead of exiting through an annular nozzle the air is forced downwardly into plenum chamber 54 increasing the pressure therein to form a ground cushion in region 20. Air is permitted to escape about the periphery of housing 52 as shown by the arrows but machine 51 is supported above the surface of the water by ground-effect region 20 since air is supplied to the plenum chamber at the same rate at which it escapes therefrom. As for the components comprising the present invention they are similar in arrangement and operation to the structure shown in FIG. 2, but with strut 31 being supported by means of collar 56 and a plurality of spoke-like members 57, 57 only two of which show in FIG. 4.

Obviously many modifications and variations of the present invention are possible in the light of the above teachings. It is therefore to be understood that within the scope of the appended claims the invention may be practiced otherwise than as specifically described.

What is claimed is:

1. A ground-effect machine for operation over water comprising in combination a housing having an opening therethrough, air pump means including drive means therefor supported within said housing and arranged in said opening whereby air is inducted from the atmosphere through said opening into the interior of said housing and directed downwardly, means providing communication between the interior of said housing and the zone beneath said ground-effect machine whereby air downwardly directed by said air pump means is emitted from said ground-effect machine to create and maintain a ground cushion in said zone, a nuclear reactor power source for supplying energy to said drive means and disposed below and in spaced relation to said housing, a hollow watertight strut means secured to said housing and said power source whereby said power source is maintained submerged a sufficient depth in the water and with the housing disposed entirely above said water to materially reduce the radiation exposure of said housing of said power source, and means in said hollow strut and connected with said power source and drive means whereby energy is transferred from said power source to said drive means and said air pump means.

2. A ground-effect machine for operation over water comprising in combination a housing, a vertical well within said housing, said vertical well communicating with the atmosphere at the upper end thereof, air pump means including drive means therefor mounted in said vertical well, means below said air pump means providing communication between said vertical well and the zone beneath said ground-effect machine, a nuclear reactor depending from said housing, a strut means secured to said housing adapted for connecting said nuclear reactor to said housing to maintain said nuclear reactor submerged and in spaced relation to said ground-effect machine and means to transfer power from said nuclear reactor to said drive means.

3. A ground-effect machine for operation over water comprising in combination an exterior housing, an interior housing arranged within said exterior housing and spaced therefrom to define a vertical well, said well communicating with the atmosphere above said machine through an air intake and with the region below said machine through an annular nozzle, said nozzle being defined by the peripheral space formed by the interior and exterior housings, a fan mounted in said well, a turbine mounted below said fan in driving arrangement therewith, a nuclear reactor depending from said interior housing by means of a hollow strut and disposed below and in vertical spaced relationship to said interior and exterior housings, said nuclear reactor being maintained in a submerged condition whereby said interior and exterior housings are water-shielded from radiation originating in said nuclear reactor and heat exchange means interconnected between said nuclear reactor and said turbine whereby heat energy is transferred from said nuclear reactor to said turbine by means in said strut.

4. A ground-effect machine for operation over water comprising in combination a housing, said housing being formed with an outer wall and a dished-out lower portion spaced from said outer wall, the peripheries of said wall and said lower portion forming an outlet nozzle, a vertical well inclosed within said housing communicating with the atmosphere above said machine through an air intake and with the atmosphere below the machine through said nozzle, an air pump including driving means mounted in said well whereby air is inducted from the atmosphere through said air intake into said housing and directed downwardly to exit from said housing to the region below through said nozzle, said air pump driving means including a turbine mounted in said well below said air pump in driving arrangement therewith, a nuclear reactor depending from said housing by means of a hollow strut and disposed below and parallel with the lower extremities of said housing, said nuclear reactor being maintained submerged whereby said machine is water-shielded from radiation originating in said nuclear reactor, and heat exchange means extending through said strut and interconnecting said nuclear reactor and said turbine.

5. A ground-effect machine for operation over water having a housing, a vertical well within said housing communicating with the atmosphere above through an opening in said housing and with the atmosphere below through annular nozzle means formed by the periphery of said housing, air pump means including driving means mounted in said vertical well to create a ground-cushion region beneath said machine and energy producing and transmitting means comprising in combination a nuclear reactor and a heat exchanger therefor interconnecting said nuclear reactor and said driving means for said air pump means by means of conduits, said nuclear reactor and heat exchanger depending from said housing by means of a connecting hollow strut and disposed below and vertically spaced from the lower extremities of said housing, and said hollow strut being connected to said housing within said ground-cushion region.

6. A nuclear powered ground-effect machine for operation over water comprising in combination a housing enclosing a vertical well having an air intake opening and an air exit nozzle, air pump means including driving means mounted in said vertical well and communicating with the air intake opening and the air exit nozzle, a nuclear reactor depending from said housing by means of a hollow strut and disposed below and parallel with the lower extremities of said housing, said nuclear reactor being maintained submerged whereby said housing is water-shielded from radiation originating in said nuclear reactor, and heat exchange means interconnected between said nuclear reactor and said air pump means.

References Cited in the file of this patent

UNITED STATES PATENTS

| | | |
|---|---|---|
| 1,838,354 | Bauer | Dec. 29, 1931 |
| 2,444,318 | Warner | June 29, 1948 |
| 2,822,776 | Morganstern | Feb. 11, 1958 |

FOREIGN PATENTS

| | | |
|---|---|---|
| 219,133 | Australia | Nov. 24, 1958 |

OTHER REFERENCES

Publication: "Popular Science," July 1959, vol. 175, No. 1, page 80.

Publication: "Popular Science," March 1959, pages 106–112, 238, 240 and 242.